(12) United States Patent
Collins, Jr.

(10) Patent No.: US 8,092,142 B2
(45) Date of Patent: Jan. 10, 2012

(54) RECREATIONAL VEHICLE RAMP AND STORAGE LIFT

(76) Inventor: Richard D Collins, Jr., Corona, CA (US)

(*) Notice: Subject to any disclaimer, the term of this patent is extended or adjusted under 35 U.S.C. 154(b) by 464 days.

(21) Appl. No.: 12/389,219

(22) Filed: Feb. 19, 2009

(65) Prior Publication Data

US 2010/0209222 A1 Aug. 19, 2010

(51) Int. Cl.
*B60P 9/00* (2006.01)
(52) U.S. Cl. ........ 414/462; 414/538; 414/540; 414/785; 211/18; 224/488; 224/534
(58) Field of Classification Search .................. 414/462, 414/494, 538, 540, 571, 592, 785, 537; 224/488, 224/534; 211/18
See application file for complete search history.

(56) References Cited

U.S. PATENT DOCUMENTS

| | | | | |
|---|---|---|---|---|
| 3,651,623 | A * | 3/1972 | Harley | 56/15.5 |
| 4,191,316 | A * | 3/1980 | Baumgartner | 414/462 |
| 4,455,119 | A * | 6/1984 | Smith | 414/537 |
| 5,431,522 | A * | 7/1995 | Ross | 414/462 |
| 5,456,564 | A | 10/1995 | Bianchini | |
| 5,553,718 | A * | 9/1996 | Robar | 211/18 |
| 5,553,762 | A | 9/1996 | Brown | |
| 5,816,763 | A | 10/1998 | Hamann et al. | |
| 5,938,395 | A | 8/1999 | Dumont, Jr. | |
| 5,984,613 | A | 11/1999 | Motilewa | |
| 6,485,243 | B1 | 11/2002 | Ferman | |
| 6,746,200 | B1 * | 6/2004 | Rinke | 414/545 |
| RE39,646 | E | 5/2007 | Dehl | |
| 7,344,184 | B2 | 3/2008 | Salvador et al. | |
| 7,455,489 | B1 | 11/2008 | Klev et al. | |
| 7,611,320 | B2 * | 11/2009 | Bell | 414/462 |
| 2005/0035862 | A1 * | 2/2005 | Wildman et al. | 340/573.1 |
| 2008/0044269 | A1 * | 2/2008 | Pradenas | 414/462 |
| 2010/0135756 | A1 * | 6/2010 | Winter, IV | 414/462 |

* cited by examiner

*Primary Examiner* — Scott Lowe
(74) *Attorney, Agent, or Firm* — Kirk A. Buhler; Buhler & Associates

(57) ABSTRACT

Improvements in a vertical recreational vehicle ramp and lift that allows a recreational vehicle to be stored and transported in a vertical orientation. A cable from the lift mechanism connects to a recreational vehicle. The cable in then retracted to lift the recreational vehicle into a vertical orientation. This method of storage reduces the amount of space that is required to store a recreational vehicle. The storage method can be used in a garage, on the back or within a mobile transportation vehicle. The lifting device can be a powered or manual crank device that lifts the recreational vehicle. The ramp can be used to transport other vehicles into the truck and also provides protection of the wheels of the recreational vehicle against here the vehicle is stored.

18 Claims, 3 Drawing Sheets ated Nov. 25, 2008 to Kurt Klev et al., disclose ramps where the recreational vehicle is driven onto the ramps to store the vehicle onto or within the bed or back of a larger transportation vehicle. While these patents again cover transportation of the recreational vehicle they also do not provide a smaller storage area and they can use valuable space.

RECREATIONAL VEHICLE RAMP AND STORAGE LIFT

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a transportation and storage system for a recreational vehicle.

2. Description of Related Art Including Information Disclosed Under 37 CFR 1.97 and 1.98

Most storage and transportation systems for recreational vehicles involve storing the recreational vehicle in a horizontal orientation. This usually involves stacking the recreational vehicles or nesting them to reduce the storage space. Several products and patents have been issued on storage or transportation systems for recreational vehicles. Exemplary examples of patents covering these products are disclosed herein.

U.S. Pat. No. RE39,646 issued May 22, 2007 to Gilbert L. Dehl, U.S. Pat. No. 5,984,613 issued Nov. 16, 1999 and U.S. Pat. No. 5,816,763 issued Oct. 6, 1998 to Bernard j. Hamann et al., disclose inventions where the vehicle is moved or driven onto a platform and the platform lifts the vehicle off the ground such that the vehicle remains in essentially the same orientation. While these patents provide a lifting mechanism they do not provide for storage of the recreational vehicle in a smaller area. This patent does not.

U.S. Pat. No. 6,485,243 issued Nov. 26, 2002, U.S. Pat. No. 5,456,564 issued Oct. 10, 1995 to Thomas R. Bianchini and U.S. Pat. No. 5,938,395 issued Aug. 17, 1999 to John W. Dumont Jr., provide pivoting platforms where the recreational vehicle is picked up and rotates from the ground to the storage location. While this provides a transportation method for the recreational vehicle, the recreational vehicle is not stored in a vertical orientation where the storage or transportation takes less space. This patent does not.

U.S. Pat. No. 7,334,184 issued Mar. 18, 2008 to Christopher Salvador et al., U.S. Pat. No. 5,553,762 issued Sep. 10, 1996 to Charles Brown and U.S. Pat. No. 7,455,489 issued Nov. 25, 2008 to Kurt Klev et al., disclose ramps where the recreational vehicle is driven onto the ramps to store the vehicle onto or within the bed or back of a larger transportation vehicle. While these patents again cover transportation of the recreational vehicle they also do not provide a smaller storage area and they can use valuable space.

What is needed is a storage and lifting mechanism where the vehicle is lifted into from a horizontal to a vertical orientation onto a vertically mounted ramp that reduces the amount of area where the recreational vehicle is stored. The vehicle can be stored in a vertical orientation on a garage wall or the rear of a travel trailer.

BRIEF SUMMARY OF THE INVENTION

It is an object of the recreation vehicle ramp and storage lift to store a recreational vehicle in a smaller area. The smaller area is accomplished by storing the recreational vehicle in a vertical orientation. The recreational vehicle can be lifted off the ground when stored to use an even smaller amount of storage space.

It is an object of the recreation vehicle ramp and storage lift to lift the recreational vehicle with a winch. The winch can be powered or manually operated to lift the recreational vehicle. The power can be supplied by the vehicles batteries, a self contained power source or from a household power source.

It is another object of the recreation vehicle ramp and storage lift to lift the recreational vehicle with a cable. The cable is easily flexible and can pull the recreational vehicle towards the storage location and then pull the vehicle vertically into the storage position.

It is another object of the recreation vehicle ramp and storage lift to further include a ramp that can be removed or relocated from a wall or back of a recreational vehicle hauler and used to move other vehicles into and out of a toy hauler. The ramp is sufficiently long enough and light enough in weight that it is easily repositioned.

It is still another object of the recreation vehicle ramp and storage lift to include tie down features that can be wrapped through the wheels of the recreational vehicle and then through the ramp. The tie downs help retain the wheels against the ramp to prevent bouncing of the recreational vehicle against the back of the toy hauler as the toy hauler is being pulled and slowed or stopped.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
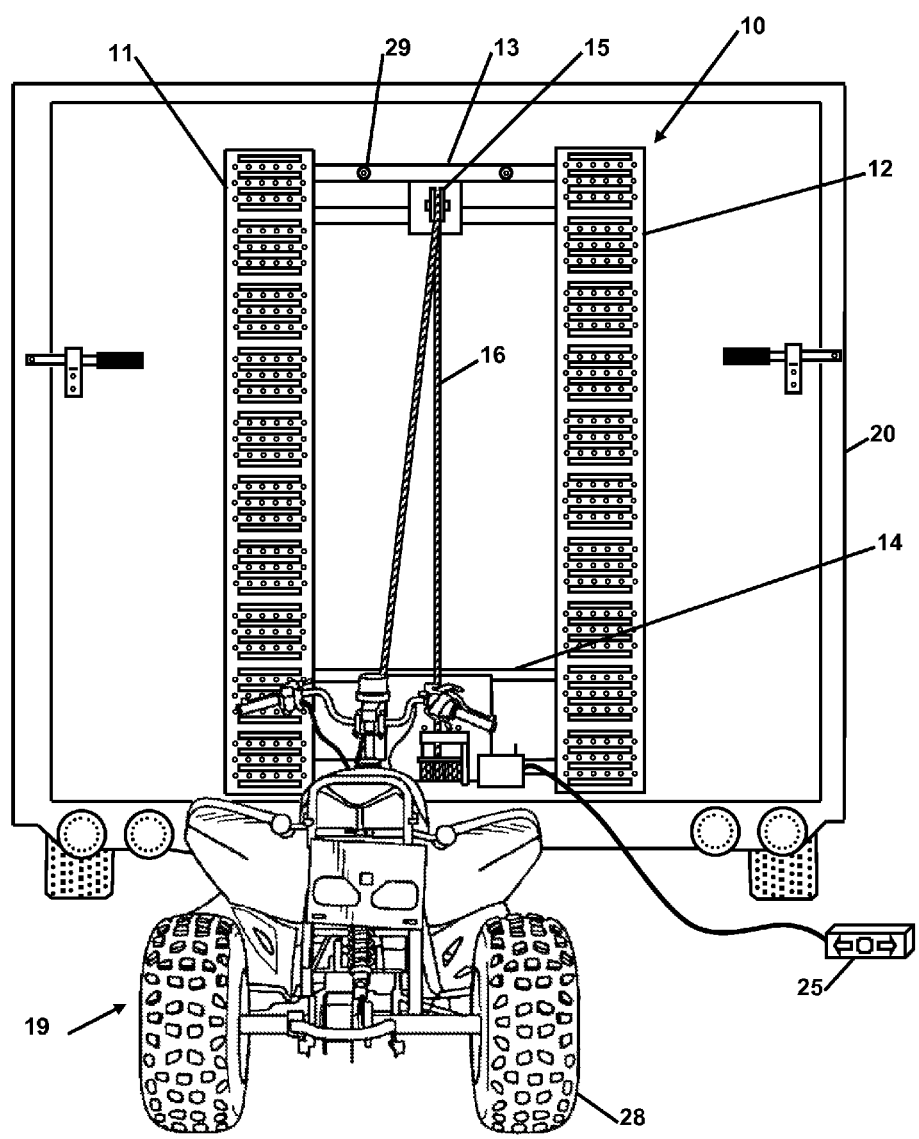
FIG. 1 shows a perspective of a recreational vehicle and the vehicle ramp and storage ramp.

FIG. 1 shows a perspective of a recreational vehicle and the vehicle ramp and storage ramp. In this figure the vertically mounted track 10 is shown mounted on the back of a toy hauler 20 or toy box that is basically a towable or a powered trailer or vehicle. In a number of cases a person will fill the interior volume with other vehicles or equipment that leaves little room for the recreational vehicle 19 or ATV. In order to increase available space within the toy hauler 20 the recreational vehicle is mounted vertically onto the back of the toy hauler. In another contemplated embodiment the vertically mounted track 10 can be mounted on the inside of a garage or on the outside of a house. Mounting the recreational vehicle 19 in a vertical orientation reduces the storage area consumed by the recreational vehicle 19, and in some cases the recreational vehicle can be mounted high enough off the ground that it literally interrupts none of the floor space. The entire structure is preferably made of metal where the components are secured with welding, bolting or similar joining methods.

The vertically mounted track 11 provides both a surface for the tires 28 or wheels of the recreational vehicle 19 to prevent damage to the underlying vertical surface and the vertically mounted track 11 can be removed from the back of the toy hauler 20 and used as ramps to move other vehicles and equipment into and out of the toy hauler. Bolts 29 or hooks secure the vertically mounted track onto the toy hauler in a permanent or temporary relationship. In the embodiment shown, the vertically mounted tracks 11 have a first track 11 and a second track 12 connected together with an upper cross member(s) 13 and a lower cross member 14. These cross members maintain the vertical tracks in an orthogonal relationship. Mounted to the lower cross member is a lifting winch that is shown and described in more detail with FIG. 3. A cable 16 extends from the winch vertically to the upper cross member(s) 13 where the cable 16 passes through a pulley 15. The cable 16 then extends downward where the free end is secured to a recreational vehicle 19.

In this embodiment the winch is controlled with a tethered pendant 25 that controls retracting and extending the cable 16 to raise and lower a secured recreational vehicle 19. In another contemplated embodiment the control of the winch is with a wireless remote control. In still another contemplated embodiment the winch in a manually operated crank. Each of these embodiments provides a similar function to raise and lower the recreational vehicle 19 onto and off of the vertically mounted track 11.

Figure 2:
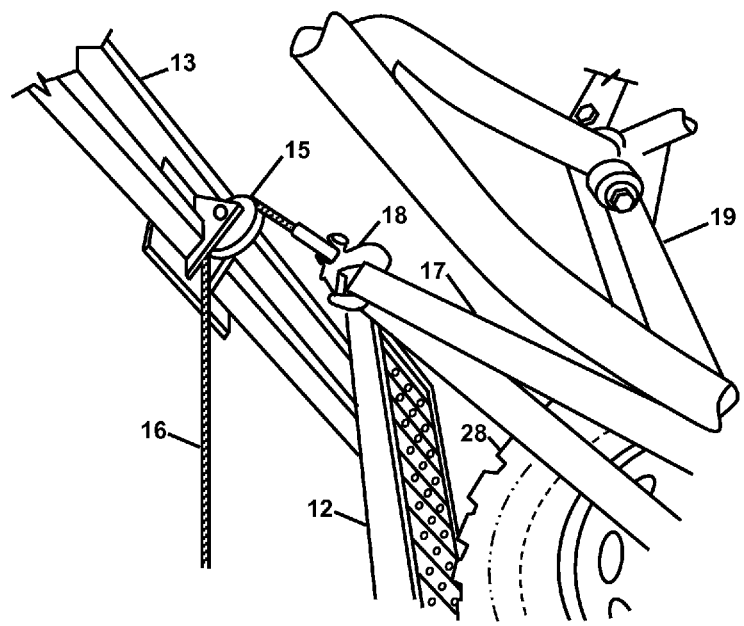
FIG. 2 shows a perspective view of a recreational vehicle being lifted towards the upper pulley.

FIG. 2 shows a perspective view of a recreational vehicle 19 being lifted towards the upper pulley 15. This detailed view shows the recreational vehicle 19 pulled nearly to the top of the vertically mounted track with the second track 12 being visible. One tire 28 of the recreational vehicle 19 is shown in contact with the second track 12. The lifting cable 16 is shown extending up from the winch (not shown) and over or through the pulley 15. The cable 16 then enters a hook 18. A strap 17 wraps onto or through the recreational vehicle 19 and is secured within the hook 18. The cross member(s) 13 connect the vertically mounted tracks. When the recreational vehicle 19 is in it elevated position securing straps (not shown in this view) can be placed through the wheels 28 and the vertical track(s) to hold the recreational vehicle in place with it is being transported.

Figure 3:
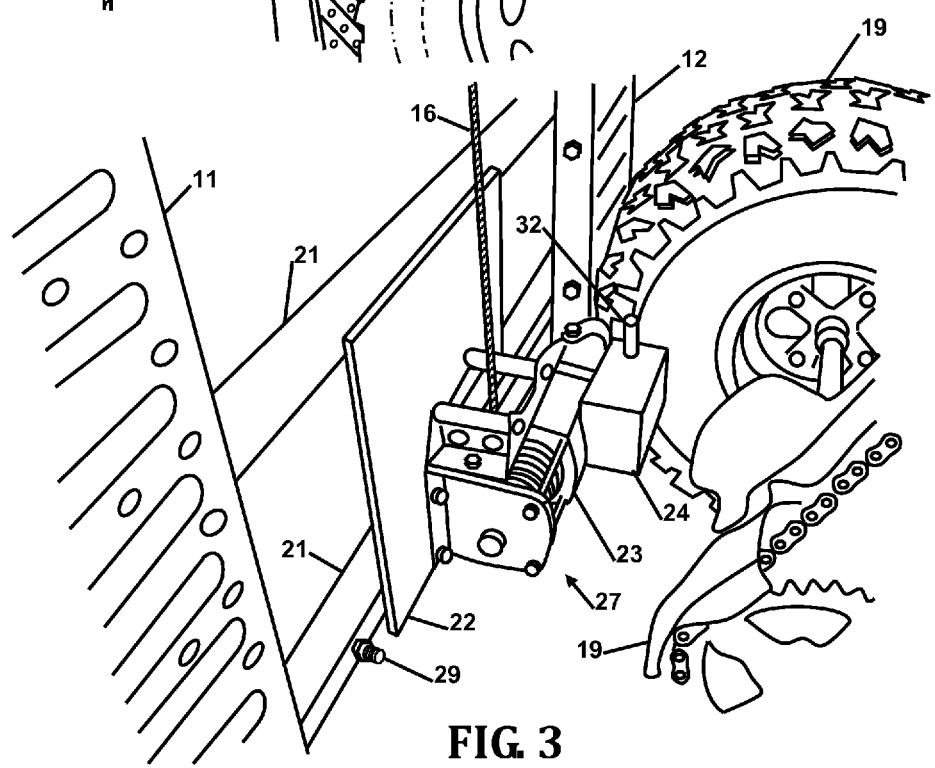
FIG. 3 shows a perspective view of the mechanical lifting mechanism.

FIG. 3 shows a perspective view of the mechanical lifting mechanism. In this view, a portion of the first track 11 and the second track 12 are shown. Cross member 21 are connected between the vertically mounted tracks. A plurality of bolts 29 or securing means holds the cross member(s) 21 to the vertical surface or the back of the toy hauler. A support plate 22 is secured to the cross members 21 by welding or the like. The winch 23 is bolted or otherwise secured to the support plate 22. The lifting mechanism 27 is preferably a winch that can be a number of different types including but not limited to manual crank, 110 volt powered, 12 volt powered from the vehicles power supply or self contained with its own power source of batteries. The cable 16 is shown extending down into the take-up spool of the winch 23.

In the embodiment shown the winch 23 has a transmitter/receiver module 24. The transmitter/receiver allows for wireless control of the winch using a similar frequency and control means as would be found in a car alarm or garage door remote. In the preferred embodiment of a wireless remote controller 24 the wireless receiver also has a sensor to determine the presence or absence of load on the cable 16 that would indicate the status of the recreational vehicle on the cable. In a simple sensing method a mechanical switch in activated or de-activated when the load on the cable 16 is above or below some preset limit such as 100 pounds. Any change above or below this load would send a signal through the antenna 32 to a wired or wireless receiver (30 in FIG. 4). Tire 19 is shown resting on the second vertical track 12. A portion of the power drive system of the recreational vehicle 19 is shown. In the preferred embodiment the vertically mounted tracks, the frame, the pulley and the winch all exist in a fairly plainer relationship that allows the vertically mounted track to be used as a ramp for loading or unloading other vehicles or equipment into and out of the toy hauler.

Figure 4:
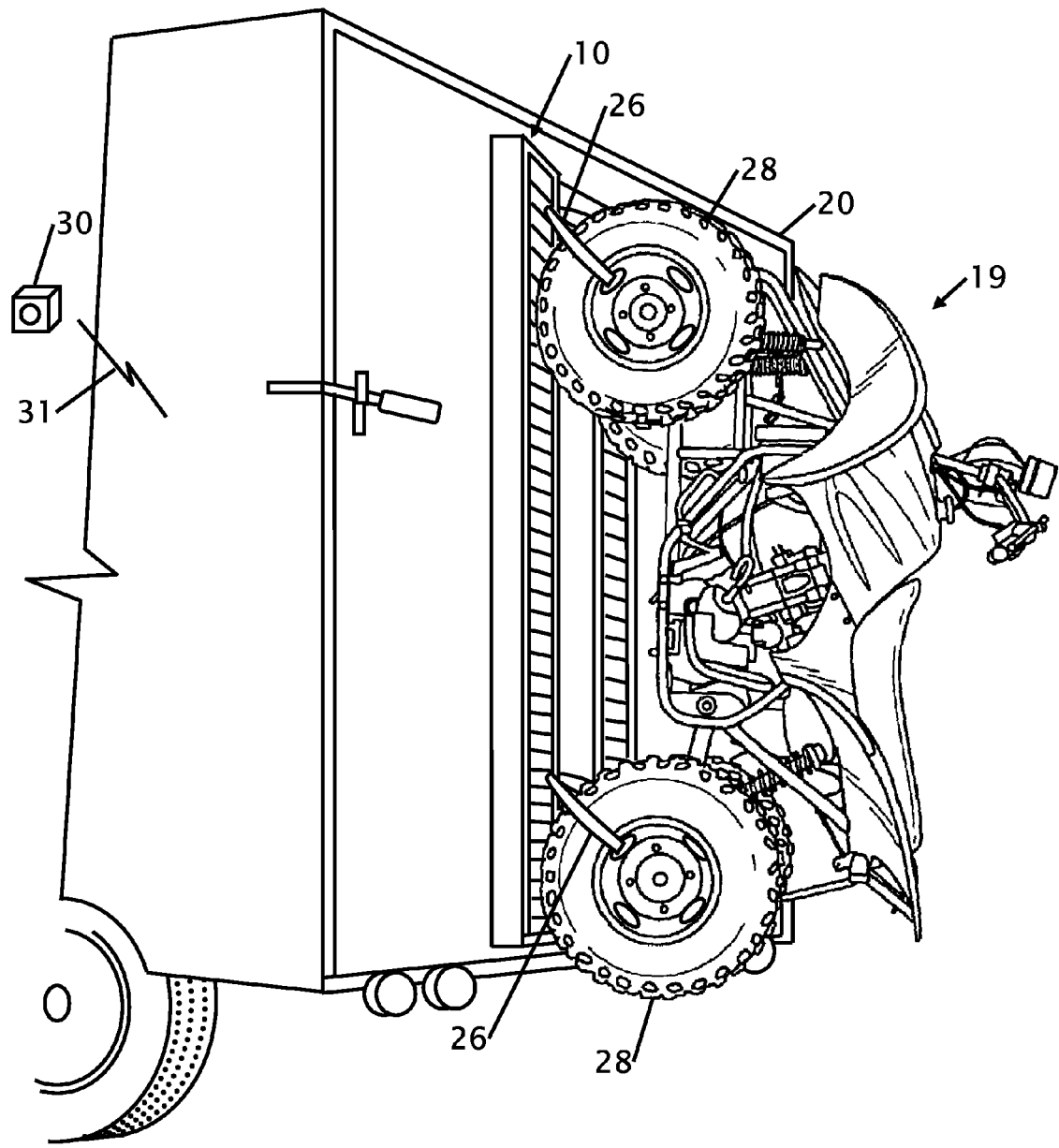
FIG. 4 shows a perspective view of a recreational vehicle in the stored position.

FIG. 4 shows a perspective view of a recreational vehicle 19 in the stored position. The back and a portion of the side of the toy hauler 20 is shown with the vertically mounted ramp 10 secured to the back door of the toy hauler 20. The tires 28 are shown in contact with the vertical tracks. In this figure securing straps 26 are shown extending through the rims of the wheels and through the rungs of the vertically mounted tracks. The securing straps help prevent bouncing of the recreational vehicle 19 against the back of the toy hauler 20. The straps also secure the recreational vehicle 19 in the event of problems with the cable and or winch (not shown). A signal 31 is shown transmitted from the transmitter (not shown) to a receiver module 30 that can indicate the presence of the recreational vehicle 19 on the vertically mounted ramps and can act as a transmitter to control the winch. In this embodiment the receiver 30 is wireless and can be carrier by a person or placed within the cab of the vehicle.

Thus, specific embodiments of a recreational vehicle ramp and storage lift have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A recreational vehicle ramp and lift comprising:
   a vertically mounted and vertically secured track primarily secured to a vertical vehicle wall;
   a lifting mechanism;
   a cable connecting to said lifting mechanism;
   a connection mechanism for a recreational vehicle;
   wherein said lifting mechanism lifts said recreational vehicle such that tires of said recreational vehicle are in contact and role upon said vertically mounted track while said recreational vehicle is being lifted;
   said storage lift further includes a sensor that determines the presence of a recreational vehicle secured to said lift, and
   said sensor transmits a wired or wireless signal to a distal receiver and an indicating device.

2. The recreational vehicle ramp and lift according to claim 1 wherein said lifting mechanism is located at the bottom of said vertically mounted track.

3. The recreational vehicle ramp and lift according to claim 2 that further includes a pulley mounted on a top of said vertically mounted track.

4. The recreational vehicle ramp and lift according to claim 3 wherein said lifting mechanism pulls down on said cable over said pulley.

5. The recreational vehicle ramp and lift according to claim 1 wherein said connection mechanism is a strap.

6. The recreational vehicle ramp and lift according to claim 1 wherein said strap wraps onto or through a frame member of said recreational vehicle.

7. The recreational vehicle ramp and lift according to claim 1 wherein said vertically mounted track is removable for use as an angular ramp.

8. The recreational vehicle ramp and lift according to claim 1 wherein said vertically mounted track can be detached from said vertical vehicle wall and mount onto a different wall.

9. The recreational vehicle ramp and lift according to claim 1 wherein said vertically mounted track mounts to the back of a vehicle.

10. The recreational vehicle ramp and lift according to claim 1 wherein said lifting mechanism is an electrically powered winch.

11. The recreational vehicle ramp and lift according to claim 10 wherein said lift lifting mechanism further includes a control pendant that is extendable from said lifting mechanism.

12. The recreational vehicle ramp and lift according to claim 10 wherein said lift lifting mechanism further includes a wireless remote control for operation of said lifting mechanism.

13. The recreational vehicle ramp and lift according to claim 10 wherein said electrically powered winch is powered from an automobile electrical system.

14. The recreational vehicle ramp and lift according to claim 10 wherein said electrically powered winch is powered from a household electrical system.

15. The recreational vehicle ramp and lift according to claim 10 wherein said electrically powered winch is powered from a battery that is integrated into the lift.

16. The recreational vehicle ramp and lift according to claim 1 wherein said lifting mechanism is a manual winch.

17. The recreational vehicle ramp and lift according to claim 1 that further includes tie-downs that are mountable through, around or over at least one wheels of said recreational vehicle.

18. The recreational vehicle ramp and lift according to claim 1 wherein said lifting mechanism and said cable exist within the height of said vertically mounted ramp.

* * * * *